(12) United States Patent
Pippes et al.

(10) Patent No.: US 11,485,410 B2
(45) Date of Patent: Nov. 1, 2022

(54) HYDRAULIC STEERING DEVICE WITH VARIABLE RATIO

(71) Applicant: Hydraulik Nord Fluidtechnik GmbH & Co. KG, Parchim (DE)

(72) Inventors: Thomas Pippes, Schwerin (DE); Erhard Bergmann, Banzkow OT Mirow (DE); Hartmut Voßberg, Parchim (DE)

(73) Assignee: WHITE DRIVE MOTORS AND STEERING GMBH, Parchim (DE)

( * ) Notice: Subject to any disclaimer, the term of this patent is extended or adjusted under 35 U.S.C. 154(b) by 535 days.

(21) Appl. No.: 16/590,212

(22) Filed: Oct. 1, 2019

(65) Prior Publication Data
US 2020/0108862 A1 Apr. 9, 2020

(30) Foreign Application Priority Data
Oct. 9, 2018 (DE) .......................... 102018124912.8

(51) Int. Cl.
*B62D 5/09* (2006.01)
*B62D 5/083* (2006.01)
*B62D 11/00* (2006.01)

(52) U.S. Cl.
CPC .............. *B62D 5/09* (2013.01); *B62D 5/083* (2013.01); *B62D 11/005* (2013.01)

(58) Field of Classification Search
CPC . B62D 5/09; B62D 5/097; B62D 5/32; B62D 5/083; B62D 11/005
See application file for complete search history.

(56) References Cited

U.S. PATENT DOCUMENTS

| 4,798,050 | A | * | 1/1989 | Nakamura | ................ | B62D 5/32 60/329 |
| 5,806,561 | A | * | 9/1998 | Pedersen | .................. | B62D 5/32 137/565.33 |
| 6,016,656 | A | * | 1/2000 | Sørensen | ................. | B62D 5/32 60/403 |
| 6,484,840 | B1 | * | 11/2002 | Sevelsted | ............... | B62D 5/097 60/384 |
| 6,804,956 | B2 | * | 10/2004 | Pedersen | .................. | B62D 5/32 60/385 |
| 8,225,603 | B2 | * | 7/2012 | Novacek | ................ | B62D 5/097 60/385 |
| 9,261,084 | B2 | * | 2/2016 | Petersen | ................... | F04B 7/02 |
| 9,902,422 | B2 | * | 2/2018 | Sevelsted | ................. | B62D 5/32 |
| 2014/0196804 | A1 | | 7/2014 | Petersen et al. | | |

(Continued)

FOREIGN PATENT DOCUMENTS

| CN | 2089789 U | 12/1991 |
| CN | 1211954 A | 3/1999 |
| CN | 203623771 U | 6/2014 |

(Continued)

*Primary Examiner* — Tony H Winner
*Assistant Examiner* — Harold Eric Pahlck, III
(74) *Attorney, Agent, or Firm* — Workman Nydegger

(57) ABSTRACT

A variable ratio hydraulic steering device with two or more orbit displacers ensures steering with low actuating forces even in the event of a total or partial failure of the oil flow supply. In the event of a total or partial failure of the oil flow supply, the device is capable of switching from one orbit displacer to another, if necessary, independently of the pressure at the inlet connection of the steering device.

5 Claims, 5 Drawing Sheets

(56) References Cited

U.S. PATENT DOCUMENTS

2014/0345266 A1    11/2014   Sevelsted et al.

FOREIGN PATENT DOCUMENTS

| | | |
|---|---|---|
| DE | 19942544 C2 | 12/2003 |
| DE | 10065554 B4 | 5/2005 |
| EP | 1212231 B1 | 3/2003 |
| GB | 2314057 A | 12/1997 |

\* cited by examiner

HYDRAULIC STEERING DEVICE WITH VARIABLE RATIO

BACKGROUND

The patent application relates to a hydraulic steering device with variable ratio, having the features indicated in the preamble of Claim 1.

Hydraulic steering devices of the generic type are known. EP 1 212 231 B1 discloses a hydraulic steering device with two or more metering pumps (orbit displacers) which are hydraulically connected in parallel to one another. A switching element is provided in each case between two adjacent orbit displacers, said switching element switching between a power-assisted steering mode, in which the feed volumes of the orbit displacers add up, and an emergency steering mode, in which only the first orbit displacer feeds the hydraulic fluid.

For the power-assisted steering mode, a pressure difference between a pump and an outlet connection of the switch valve must be greater than a switching pressure of a compression spring of the spring-loaded switch valve. This is independent of the pressure in cylinder connections of the hydraulic steering device, which are connected to a steering cylinder.

In the case of the emergency steering mode, the pressure difference between the pump connection and the outlet connection must be less than the switching pressure of the compression spring.

If, in the event of a partial failure of an oil supply of the hydraulic steering device, the pressure difference between the pump connection and the outlet connection is greater than the switching pressure of the compression spring, a switch is not made to the smaller feed volume. Since both orbit displacers feed the hydraulic fluid, a higher torque is required. This is the case if the supply pump provides too small an oil flow or can build up too little pressure, e.g. because of a defect.

Therefore, the disadvantage of the known solution in hydraulic steering devices having two or more orbit displacers is that, in the event of a partial failure of the oil flow supply, the admission pressure at the steering device can exceed the reset force of the compression spring of the switch valve and, consequently, switching to the smaller feed volume (emergency mode) of the first orbit displacer is prevented. This can, for example, result in significantly increased actuating forces during an emergency steering mode.

SUMMARY

The object which forms the basis of the invention is to create a hydraulic steering device of the generic type, in which these disadvantages are avoided.

The object is achieved according to the invention by a hydraulic steering device having the features indicated in Claim 1.

The fact that one side of the switch valves is connected to the control valve via a pressure line, the pressure in the respective cylinder connection being supplied to said pressure line during a steering movement and the pressure being relieved towards an outlet connection when the steering movement stops, means that it is advantageously possible to compare the pressure in the inlet connection of the steering device and the pressure in the cylinder connections with one another and to connect the chambers of the metering pump to one another or to separate them.

In a preferred configuration of the invention, an additional switch valve which is configured as a two-position valve is provided. A control connection of the switch valve is connected to an inlet connection of the steering device. A first pressure chamber on one side of the switch valve is connected to the control valve via a pressure line. A second pressure chamber on the other side of the switch valve is connected to a control connection of the switch valve between the metering pumps via a pressure line. The second pressure chamber of the switch valve is connected to an outlet connection of the steering device via an outlet line. As a result, it is advantageously possible for the switchover of the steering device between the power-assisted steering mode and emergency steering mode to no longer be dependent on the pressure difference between the inlet connection and the outlet connection of the steering device. The switchover is now dependent on a pressure difference between the inlet connection and the respective cylinder connection.

This ensures that in the case of hydraulic steering devices having two or more orbit displacers it is possible, not only in the event of a total failure but also in the event of a partial failure of the oil flow supply, to switch to the first orbit displacer, if required, independently of the pressure at the inlet connection of the steering device. Consequently, steering is possible with low actuating forces.

Further preferred configurations of the invention are set out by the remaining features which are indicated in the subordinate claims.

BRIEF DESCRIPTION OF THE DRAWINGS

The invention will be explained in greater detail below in exemplary embodiments with reference to the accompanying drawings, wherein.

Figure 1:
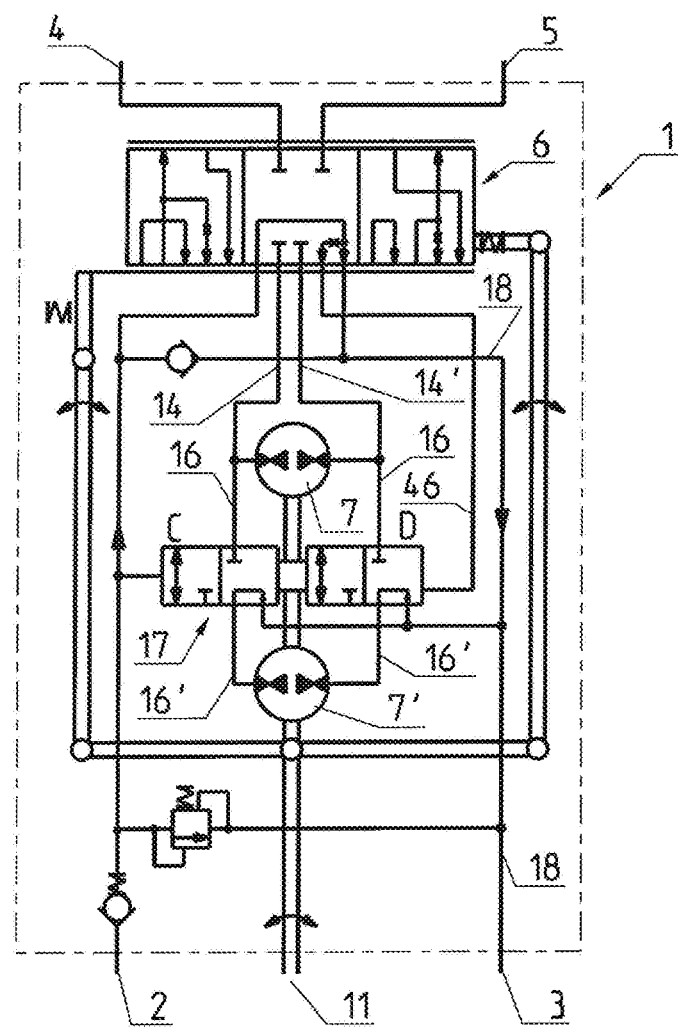
FIG. 1 shows a circuit diagram of the steering device according to the invention.
Figure 2:
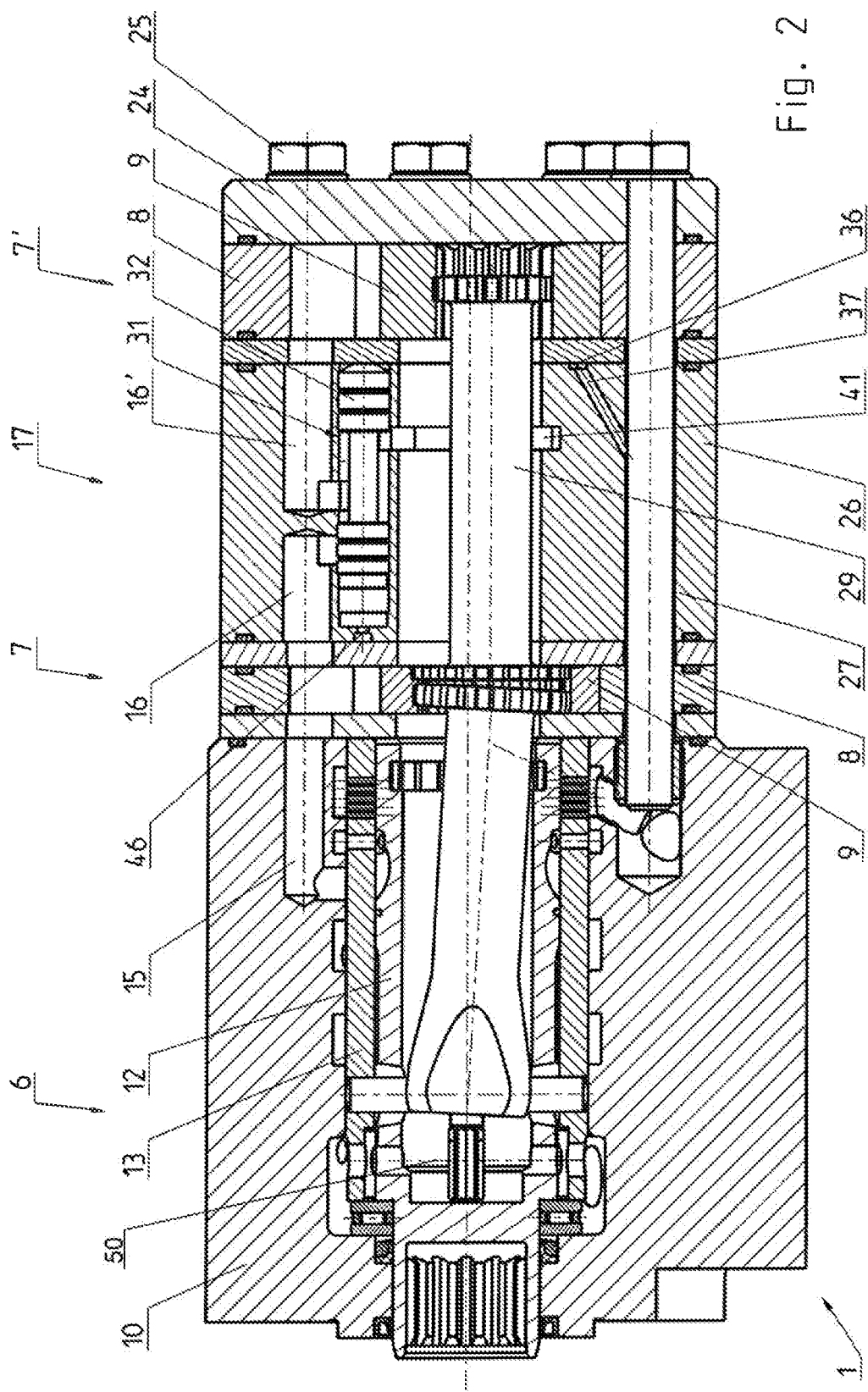
FIG. 2 shows a cross-sectional view through a steering device.
Figure 3:
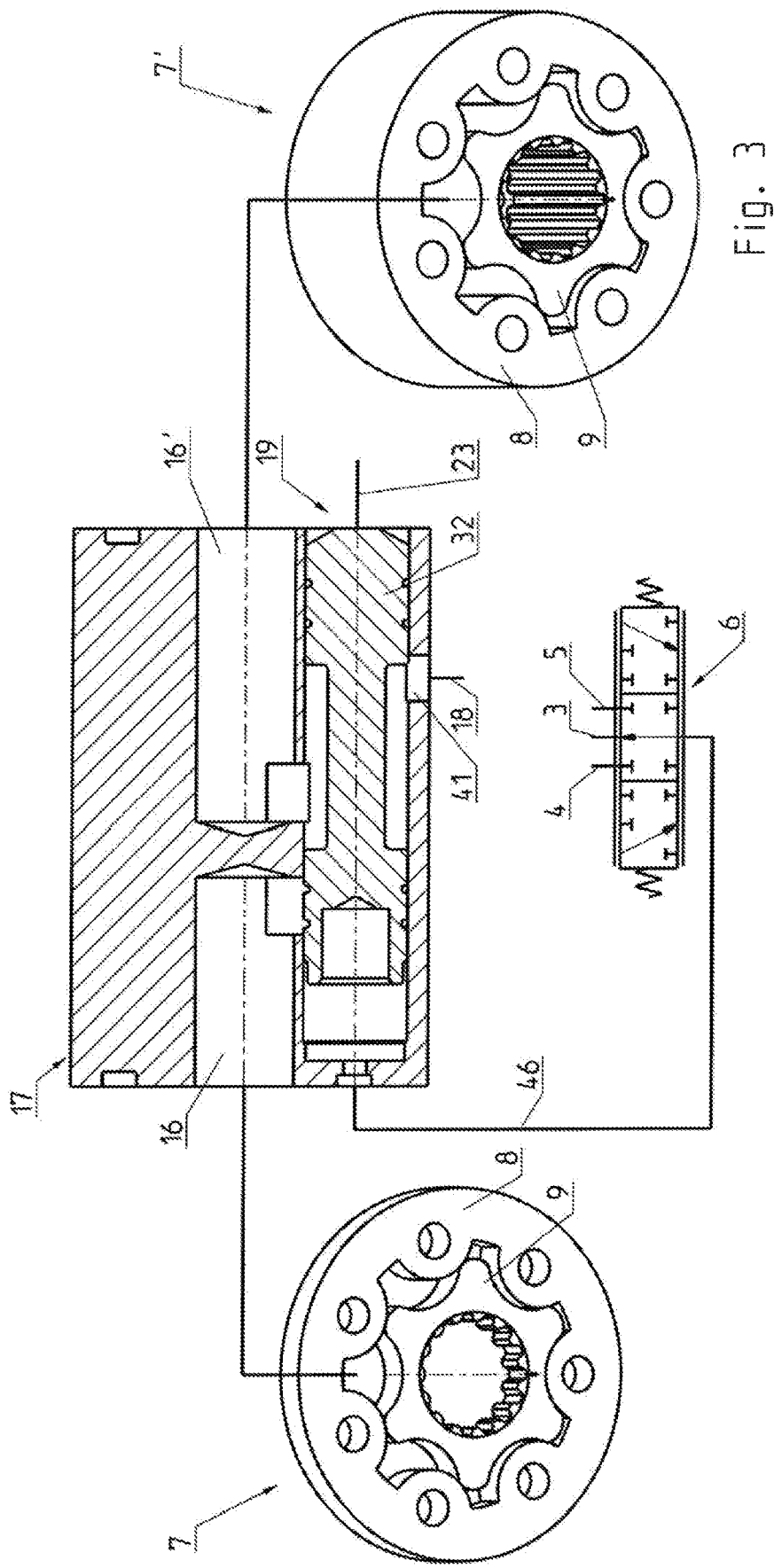
FIG. 3 shows a schematic view of parts of the steering device according to the invention.

Reference will first be made to FIGS. 1 to 3.

DETAILED DESCRIPTION OF VARIOUS EMBODIMENTS

The hydraulic steering circuit substantially consists of a supply pump which is not represented, a steering device 1, an adjusting cylinder acting on the vehicle wheels as well as a tank, which are likewise not represented.

The steering device 1 has an inlet connection 2 which is connected to the supply pump, an outlet connection 3 connected to the tank and two cylinder connections 4 and 5 which are in operative connection with the adjusting cylinder and, consequently, with the wheels to be steered.

The main elements of the steering device 1 are a control valve 6 and one or more metering pumps 7, 7' operating in accordance with the orbit principle, each having an outer ring 8 with, for example, seven teeth and a rotor gear wheel 9 with six teeth.

The control valve 6 is fitted in a housing 10 and has an inner control piston 12 which is actuatable by a steering wheel 11 and an outer control sleeve 13 which is mechanically connected to the rotor of the metering pump 7, 7'. The control piston 12 and control sleeve 13 are arranged concentrically to one another and is rotatable to a limited extent and against the force of a spring.

The control valve 6 has six inlet lines 14, arranged uniformly distributed on the circumference and acting in parallel, which are connected on the one hand to the inlet connection 2 and, on the other hand, to the inlet side of the first metering pump 7 via seven commutator bores 15. Said commutator bores 15 simultaneously connect the first metering pump 7 via the inlet line 14', the control valve 6 to one of the cylinder connections 4 or 5 to the steering cylinder for the wheels.

The first metering pump 7 is connected in parallel to a closest second metering pump 7' via seven chamber lines 16, 16', interposing a switching element 17.

The other cylinder connection 5 or 4, in each case, is simultaneously connected to the outlet connection 3 and, consequently, to the tank via the control valve 6 and an outlet line 18.

The switching element 17 comprises a total of seven switch valves 19 which are each arranged in one of the seven chamber lines 16, 16'.

Each switch valve 19 is configured as a two-position valve and has an inlet connection for one chamber line 16 coming from a preceding metering pump 7, and an outlet connection for one chamber line 16' leading to an adjacent metering pump 7'. A connection is made to the return connection 3 of the steering device and, consequently, to the tank via a return line 18.

As FIG. 3 shows in greater detail, the valve slide 32 is connected on the one side to the inlet connection 2 of the steering device via the pressure line 23 and the pressure at the respective cylinder connection 4, 5 is supplied thereto on the other side during a steering movement via a pressure line 46. In the power-assisted steering mode, the switch valve 19 takes up the end position C. If the pressure in the cylinder connection 4, 5 exceeds the admission pressure, the valve switches from the end position C into the end position D (represented in FIG. 3). This blocks the connection from the first metering pump 7 to the second metering pump 7', and the connection of the second metering pump 7' to the outlet connection 3 is opened. Thus, only the first metering pump 7 feeds hydraulic fluid to the cylinder connection 4, 5.

It can optionally be provided that the valve slide 32 is assigned a compression spring 33 which, in addition to the switching pressure of the respective cylinder connections 4, 5, can act on the valve slide 32.

Figure 4:
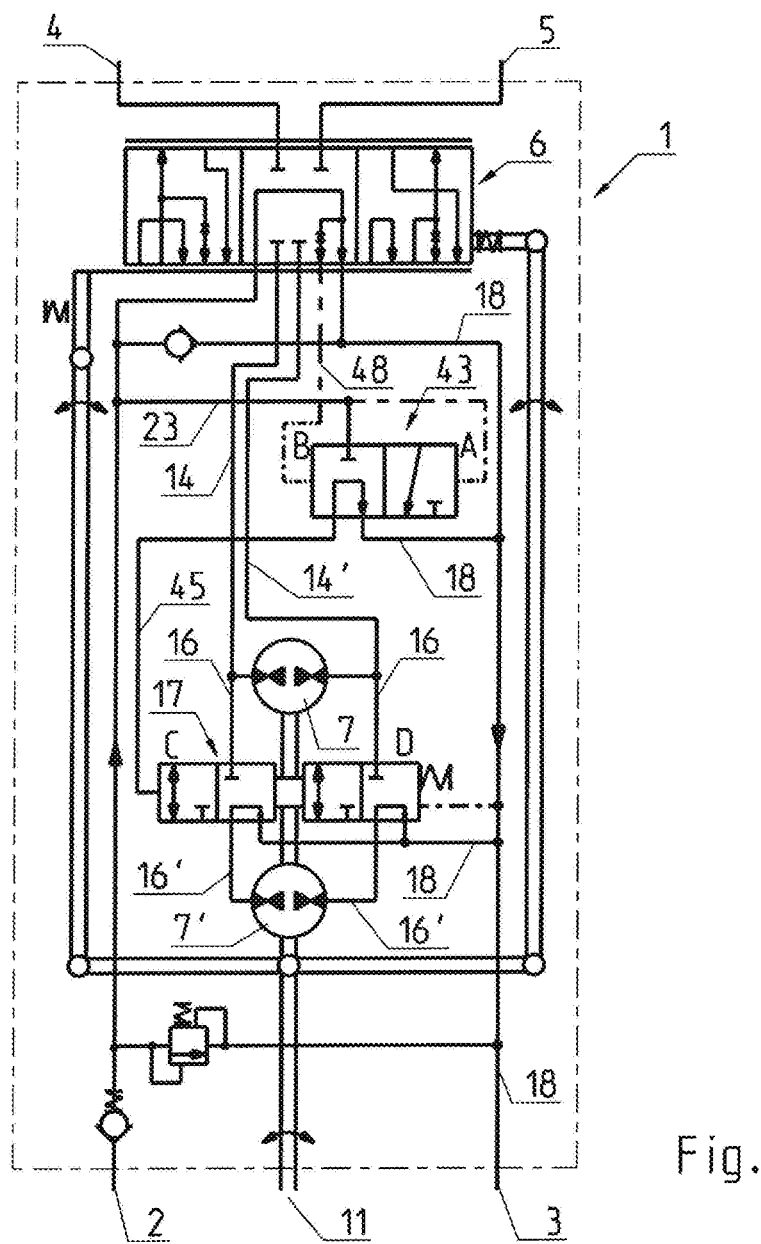
FIG. 4 shows a circuit diagram of a further exemplary embodiment.
Figure 5:
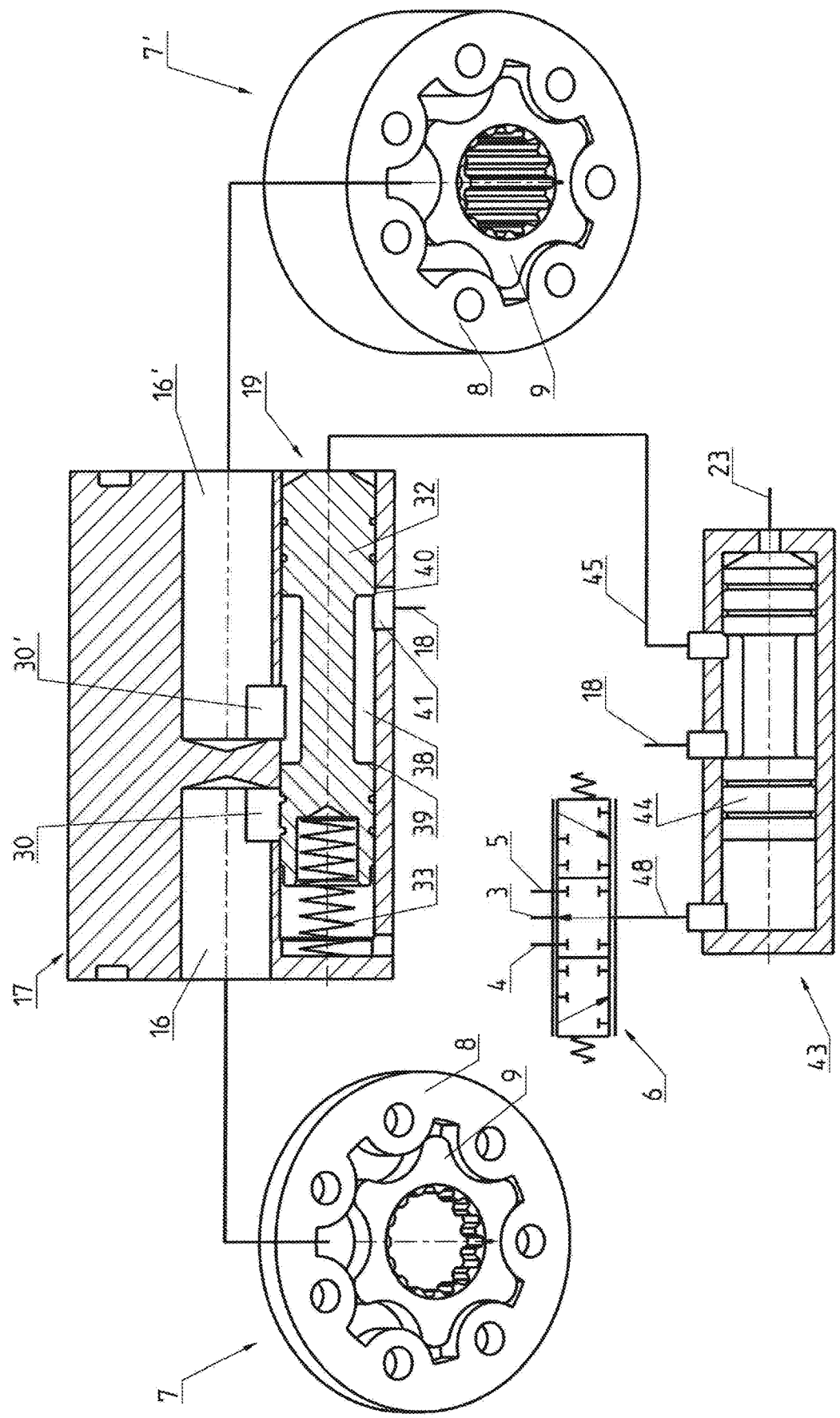
FIG. 5 shows a schematic view of parts of the further exemplary embodiment.

As a further variant (FIGS. 4 and 5), an additional switch valve 43 is provided, which is configured as a two-position valve. The pressure in the respective cylinder connection 4, 5 is supplied to said two-position valve on the one side via a pressure line 48, and said two-position valve connects the inlet connection 2 of the steering device 1 to the side of the valve slide 32 of the switch valve 19 facing away from the spring in an end position A on the other side via the pressure line 23 and the pressure line 45. In the other end position B (shown in FIG. 5), the connection from the admission pressure of the steering device 1 to the side of the valve slide 32 of the switch valve 19 facing away from the spring is blocked, and a connection from there to the outlet connection 3 via the return line 18 is opened.

In the power-assisted steering mode, the admission pressure is transferred via the pressure line 23 to one side of the switch valve 43, as a result of which the valve slide 44 takes up the end position A and thus transfers the admission pressure to the side of the valve slide 32 of the switch valve 19 facing away from the spring via the pressure line 45. Said valve slide subsequently switches from end position D into the end position C such that all of the metering pumps 7, 7' are connected to one another.

If the pressure at the cylinder connection 4, 5 exceeds the admission pressure at the switch valve 43, the switch valve 43 goes into the end position B. As a result, the connection between the pressure line 23 and the pressure line 45 on the side of the valve slide 32 of the control valve 19 facing away from the spring is interrupted, and a connection from there to the outlet connection 3 is opened. As a result of the connection of the spring-loaded side of the valve slide 32 to the outlet connection 3, the valve slide 32 is pressure equalized and is pressed by the compression spring 33 into the end position for the emergency steering mode.

The result of this is that the switchover between the power-assisted steering mode and emergency steering mode is dependent on the pressure difference between the inlet connection 2 and the respective cylinder connection 4, 5.

It can optionally be provided that the valve slide 44 is assigned a compression spring which, in addition to the switching pressure of the respective cylinder connections 4, 5, can act on the valve slide 44.

The switch valves 19 of the switching element 17 between the two displacer connections and the outlet connection 3 can have a negative overlap. This prevents a mechanical loading of the splined shaft 29.

In order to prevent the feed volume failing briefly as a result of the existing short-circuit, compression springs 33 having different spring forces can be used for the valve slides 32 of the switch valves 19.

REFERENCE NUMERALS

1 Steering device
2 Inlet connection
3 Return or outlet connection
4 Cylinder connection
5 Cylinder connection
6 Control valve
7, 7' Metering pump
8 Outer ring
9 Rotor gear wheel
10 Housing
11 Steering wheel
12 Control piston
13 Control sleeve
14, 14' Inlet line
15 Commutator bore
16, 16' Chamber line
17 Switching element
18 Return or outlet line
19 Switch valve
23 Pressure line
29 Splined shaft
32 Valve slide
33 Compression spring
43 Switch valve
44 Valve slide
45 Pressure line
46 Pressure line
48 Pressure line

The invention claimed is:
1. A hydraulic steering device, comprising:
a rotatably mounted control valve with an inner control piston which is actuatable by a steering wheel and with an outer control sleeve, wherein the inner control piston and the outer control sleeve are designed to be relatively twistable to a limited extent and against the force of a spring;

a displacement system having more than one metering pump, wherein each metering pump has an outer ring with inner teeth and a rotor gear wheel with outer teeth, which configure variable-volume chambers between them, wherein the rotatably mounted control valve is mechanically connected to the rotor gear wheel of a first metering pump via the outer control sleeve and is hydraulically connected to variable-volume chambers of the first metering pump via commutator bores, the rotor gear wheels of a second metering pump are mechanically connected via a splined shaft in each case, the chambers of the first metering pump are hydraulically connected in parallel to the chambers of the second metering pump and the chambers of the second metering pump are designed to be separable from the chambers of the first metering pump via one or more switch valves and designed to be connectable to a return line, and one side of the switch valves is connected to the rotatably mounted control valve via a pressure line and, during a steering movement, the pressure in the control valve is supplied to said pressure line, and an other side of the switch valves is connected to an inlet connection of the steering device.

2. The hydraulic steering device according to claim 1, wherein the pressure in the pressure line is relieved towards an outlet connection when the steering movement stops.

3. The hydraulic steering device according to claim 1, further comprising a second switch valve, which is configured as a two-position valve, and wherein a control connection of the second switch valve is connected to an inlet connection of the steering device, a first pressure chamber on one side of the second switch valve is connected to the control valve via a second pressure line, a second pressure chamber on an other side of the second switch valve is connectable to a second control connection of the second switch valve between the metering pumps via a third pressure line, the second pressure chamber of the second switch valve is connected to an outlet connection of the steering device via an outlet line.

4. The hydraulic steering device according to claim 1, wherein the switch valves have a negative overlap.

5. The hydraulic steering device according to claim 1, wherein the first and second switch valves each comprise a compression spring, and wherein the compression spring of the first switch valve and the compression spring of the second switch valve have different spring forces.

* * * * *